E. G. BUSSE.
BRAKE BEAM STRUT.
APPLICATION FILED JULY 6, 1909.
949,882.
Patented Feb. 22, 1910.
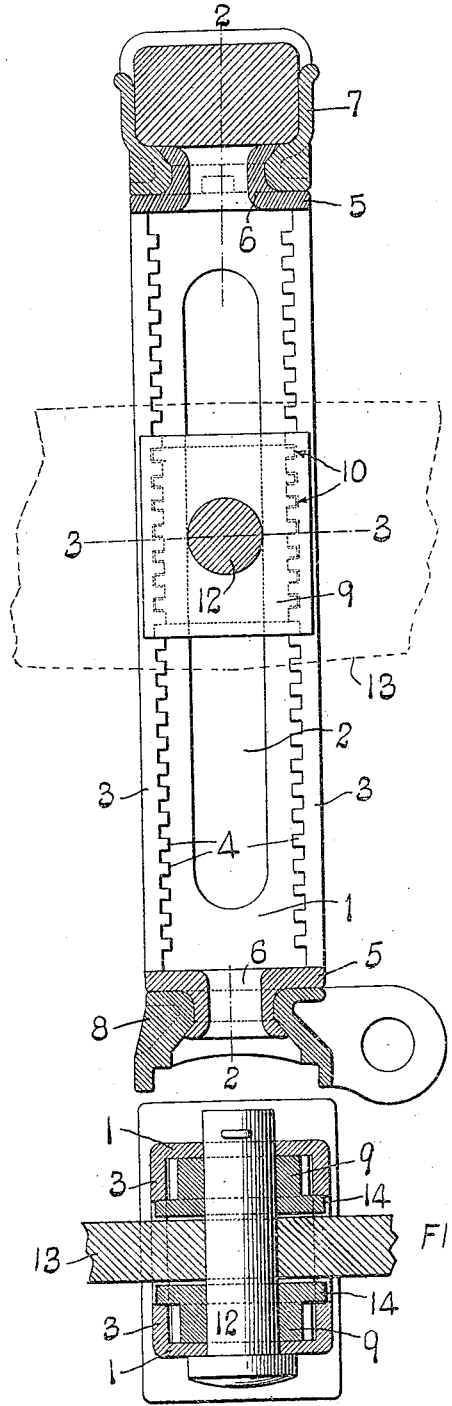
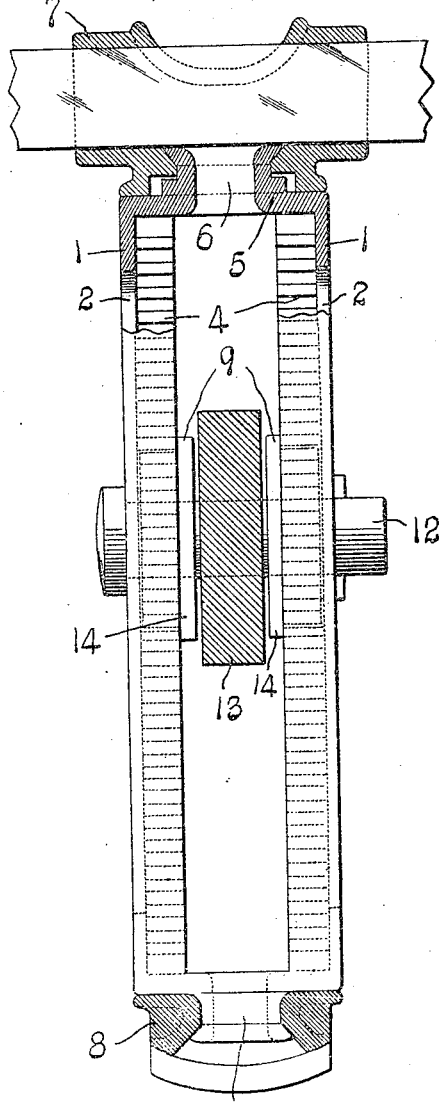
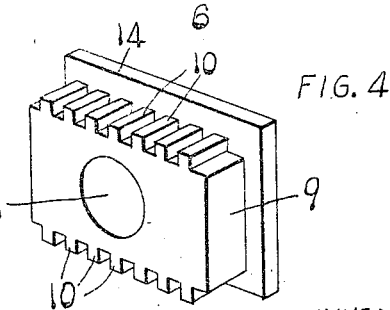
WITNESSES
INVENTOR
E. G. BUSSE
ATT'Y.

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATON OF ILLINOIS.

BRAKE-BEAM STRUT.

949,882.

Specification of Letters Patent. Patented Feb. 22, 1910.

Application filed July 6, 1909. Serial No. 506,047.

*To all whom it may concern:*

Be it known that I, EDWIN G. BUSSE, a citizen of the United States, residing at Chicago, Illinois, have invented a certain new and useful Improvement in Brake-Beam Struts, of which the following is a full, clear, and exact description, such as will enable others skilled in the art to which it appertains to make and use the same, reference being had to the accompanying drawings, forming part of this specification, in which—

Figure 1 is a section taken through the center of a reversible adjustable strut of my improved construction. Fig. 2 is a section taken on the line 2—2 of Fig. 1. Fig. 3 is a horizontal section taken on the line 3—3 of Fig. 1. Fig. 4 is a perspective view of one of the adjustable pin bearing blocks made use of in my improved strut.

My invention relates to an improved brake beam strut, particularly designed to permit the use of said strut in either right or left hand beams, and also to permit of the adjustment of the brake lever pin hole to different positions as may be required.

The object of my invention is to provide a simple, inexpensive strut, the main body portion of which may be readily shifted to any angle so as to accommodate the brake levers of right and left hand beams, and said strut being provided with a pair of adjustable blocks provided with pin holes which receive the pin on which the brake lever is fulcrumed. The adjustable pin hole principle of my invention may, with slight modifications, be advantageously used in connection with struts on the so-called solid beams, or in struts which do not have the reversible feature.

To the above purposes, my invention consists in certain novel features of construction and arrangement of parts hereinafter more fully described and claimed.

As shown in the drawing, the main body of my improved strut comprises a pair of side walls 1, provided with longitudinal slots 2, and formed integral with the top and bottom edges of said side walls are inwardly projecting flanges 3, in the under sides of which are formed teeth 4. Formed integral with the ends of the side walls 1 are end plates 5, and formed integral therewith are tubular studs 6, one of which is swiveled in a sleeve 7, which embraces the central portion of the compression member of the brake beam, and the opposite tubular stud being swiveled in a block 8 which engages the central portion of the tension member of the beam. The adjustable pin bearing blocks 9 are designed to fit against the inner faces of the side walls 1 of the body of the strut, and formed integral with the top and bottom edges of said blocks are transversely disposed teeth 10 which are adapted to interlock with the teeth 4. Formed through the centers of the blocks 9 are apertures 11 which receive the pin 12 which serves as a fulcrum for the brake lever 13. Flanges 14 are formed integral with the inner faces of the blocks 9, which flanges provide bearing faces for the sides of brake lever 13. By swiveling the tubular studs 6 on the ends of the strut in the sleeve 7 and block 8, the main body portion of said strut can readily be shifted from one angle to another, thus accommodating the brake lever at any angle, and this transforms the beam on which the strut is used from a right hand to a left hand beam, or vice versa. The blocks 9 can be readily shifted from one end of the body of the strut to the other by removing the pin 12, and thus the brake lever can be fulcrumed at different points on the strut to suit different requirements. The slots 2 in the sides of the body of the strut accommodate the pin 12 in its adjusted positions, and the interlocking teeth 4 and 10 provide means whereby the blocks 9 are rigidly maintained in their adjusted positions.

A strut of my improved construction is comparatively simple, comprises a minimum number of parts, is strong and durable, is adapted for use on right or left hand beams, and also provides for an adjustment of the fulcrum of the brake lever.

It will be readily understood that minor changes can be made in the construction and form of my improved strut, without departing from the spirit of my invention.

I claim:

1. The combination with a brake beam strut or lever post, of a pair of movable blocks thereon, which blocks are adapted to receive the brake lever pivot pin.

2. The combination with a brake beam strut or lever post, of a pair of movable blocks therein, which blocks are adapted to receive the brake lever pivot pin, and means whereby said blocks are locked in adjusted positions.

3. A brake beam strut or lever post provided with a pair of adjustable brake lever pivot pin blocks.

4. A brake beam strut or lever post, provided with a pair of adjustable brake lever pivot pin blocks, which blocks interlock with the body of the strut or post.

5. A brake beam strut or lever post, provided with a pair of adjustable brake lever pivot pin blocks, and there being an interlocking joint between said blocks and the body of the strut or post.

6. The combination with a brake beam strut or lever post, of a pair of brake lever pivot pin blocks adjustably arranged on the strut, and there being interlocking teeth formed on the body of the strut and on said blocks.

7. The combination with a reversible brake beam strut or lever post, of a pair of brake lever pivot pin blocks adjustably arranged on the strut.

8. The combination with a reversible brake beam strut or lever post, of a pair of brake lever pivot pin blocks adjustably arranged on the strut, and there being an interlocking joint between said blocks and the strut.

9. The combination with a reversible brake beam strut or lever post, of a pair of brake lever pivot pin blocks adjustably arranged on the strut, and there being interlocking teeth formed on the body of the strut and on said blocks.

10. The combination with a brake beam strut or lever post, provided with a series of notches, of a brake lever pivot pin block adjustably arranged on the strut and provided with a series of teeth adapted to engage the notches in the strut.

11. The combination with a reversible brake beam strut or lever post, provided with a series of notches, of a brake lever pin block adjustably arranged on the strut and provided with a series of teeth adapted to engage the notches in the strut.

12. The combination with a brake beam strut or lever post, provided with a row of teeth, and a brake lever pivot pin block adjustably arranged on the strut and provided with a series of notches adapted to receive the teeth on the strut.

13. The combination with a brake beam strut or lever post, provided with a plurality of rows of notches, of a brake lever pivot pin block adjustably arranged on the strut and provided with a plurality of rows of teeth adapted to engage the rows of notches on the strut.

14. The combination with a brake beam strut or lever post, of beam engaging members swiveled at the ends of the strut, and a plurality of brake lever pivot pin blocks adjustably arranged on the strut.

15. The combination with a brake beam strut or lever post, of beam engaging members swiveled at the ends of the strut, a plurality of brake lever pivot pin blocks adjustably arranged on the strut, and which blocks interlock with said strut.

16. A brake beam strut or lever post, provided with a longitudinally disposed series of notches whereby a brake lever pivot pin block is adjustably arranged on the strut.

17. A brake beam strut or lever post, provided with a pair of oppositely arranged rows of notches whereby a brake lever pivot pin block may be adjustably positioned on said strut.

18. A brake beam strut or lever post, having a pair of walls, there being oppositely disposed rows of notches formed on each wall whereby a pair of brake lever pivot pin blocks are adjustably mounted on the strut.

19. The combination with a reversible brake beam strut or lever post, of a brake lever pin block adjustably arranged on the strut.

20. The combination with a brake beam strut or lever post, of a pair of adjustable brake lever pivot pin blocks, and members swiveled on the ends of the strut and adapted to engage the compression and tension members of the brake beam.

21. The combination with a brake beam strut or lever post, of a pair of brake lever pivot pin blocks arranged on the strut, there being interlocking joints between said blocks and the body of the strut, and members swiveled on the ends of the strut for engaging the compression and tension members of the beam.

22. A brake lever pivot pin block provided with a row of teeth adapted to adjustably hold it in position.

23. A brake lever pivot pin block provided with two rows of teeth to adjustably hold it in position.

24. In a brake beam strut or lever post, a pair of oppositely disposed brake lever pivot pin blocks adjustably mounted on the strut and having an interlocking connection therewith.

25. In a brake beam strut or lever post, an adjustable pin block which is held in position by the lever.

26. In a brake lever strut or post, two adjustable pin blocks which are held in position by the lever positioned therebetween.

27. A brake lever strut or post, slotted for the introduction and removal of the lever pin, adjustable blocks in which said pin is mounted, said blocks being held in position by the lever which is mounted on the pin.

In testimony whereof I hereunto affix my signature in the presence of two witnesses, this 26th day of June 1909.

EDWIN G. BUSSE.

Witnesses:
EDWARD T. WALKER,
JOSEPH W. WEINLAND.